J. J. & C. H. COOK.
HOSE CLAMP.
APPLICATION FILED NOV. 1, 1915.

1,236,546.

Patented Aug. 14, 1917.
2 SHEETS—SHEET 1.

WITNESSES:

James J. Cook,
Charles H. Cook, INVENTORS

BY

Attorney

J. J. & C. H. COOK.
HOSE CLAMP.
APPLICATION FILED NOV. 1, 1915.

1,236,546.

Patented Aug. 14, 1917
2 SHEETS—SHEET 2.

James J. Cook,
Charles H. Cook,
INVENTORS

WITNESSES:
Jas. K. M°Cathran
T. J. Mawhinney

BY
E. G. Siggers
Attorney

UNITED STATES PATENT OFFICE.

JAMES J. COOK AND CHARLES H. COOK, OF JERSEY CITY, NEW JERSEY.

HOSE-CLAMP.

1,236,546.  Specification of Letters Patent.  Patented Aug. 14, 1917.

Application filed November 1, 1915. Serial No. 59,133.

*To all whom it may concern:*

Be it known that we, JAMES J. COOK and CHARLES H. COOK, citizens of the United States, residing at Jersey City, in the county of Hudson and State of New Jersey, have invented a new and useful Hose-Clamp, of which the following is a specification.

This invention has reference to hose clamps and its object is to provide a clamp producible from sheet metal wherein an ordinary machine screw or the like may be utilized as the clamping screw.

In accordance with the present invention the clamp, which is intended for securing the ends of hose, flexible pipes and the like, to suitable couplings, is formed of one or more pieces of sheet metal with either or both terminal parts rolled or coiled upon themselves, and this is especially true of the terminal portion through which the clamping screw is threaded, the nut being formed of a plurality of turns which may be produced about a common axis with a threaded passage for the screw therethrough, thus producing a particularly strong nut made of a sufficient number of thicknesses of sheet metal capable of relative movement one with respect to the other, so that under the strain of the screw the layers making up the nut tend to bind on the screw and thereby lock the latter against accidental loosening, the whole structure tending to uniformly contract about the hose to which it is applied, so as to exert a uniformly distributed pressure thereupon.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications come within the scope of the appended claims.

Fig. 12 is an end elevation of the clamp of Fig. 11, showing the adjustment of the tongue to admit of the ready application of the clamp to hose and the like.

Figure 1:
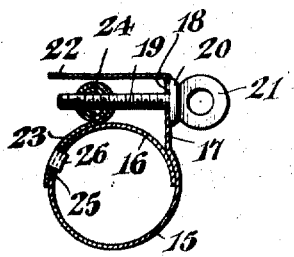
Figure 1 is a transverse section, taken centrally through one form of the clamp.
Figure 3:
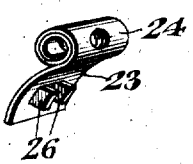
Fig. 3 is a detail perspective view of the drawing strap and nut or traveler used in the structure shown in Fig. 1.
Figure 2:
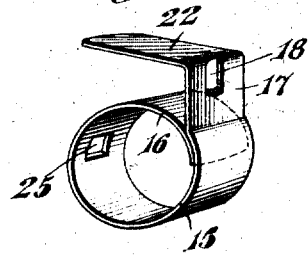
Fig. 2 is a detail perspective view of the band or body portion of the clamp of Fig. 1.

Referring to the drawings, and particularly to Figs. 1, 2 and 3, the clamp comprises a band or body portion made preferably of spring metal such as sheet metal and adapted to encircle the hose, flexible pipe or the like. This band 15 is rolled into circular or hoop form to loosely fit over the hose or other member to which the clamp is to be attached. The band is provided with a tongue 16 at one end adapted to lap under the opposite end of the band and provide a complete inclosure for the article to which the clamp is attached. As shown in Figs. 1, 2 and 3, this tongue is integral with the band 15. The other end of the band 15 is bent at substantially a tangent to the body of the clamp, to provide a screw support 17 having a suitable elongated opening 18 therethrough for the reception of the shank of a clamping screw 19 to turn freely in said opening. As shown in Fig. 1, the clamping screw 19 which is in the form of a machine screw is shouldered as at 20 for engagement against the support 17, and provided with a flat head 21 for engagement by the fingers of an operator to turn the clamping screw 20. The outer end of the support 17 is bent at an angle to the support and toward the opposite side of the clamp to provide a guard or shield 22 extending above and in the same direction as the clamping screw 19, and it preferably extends a slight distance beyond the threaded end of the screw so as to ward off clothing or other obstructions which might possibly come into contact with and be caught by or entangled with the free end of the clamping screw. In the form of the invention shown in Figs. 1, 2 and 3 the band or body of the clamp, the support 17 for holding the clamping screw, and the guard which protects the clamping screw, as well as the tongue 16 are all formed integrally from a strip of metal.

For the purpose of effecting the desired circumferential binding action of the clamp, and for preventing the undue binding of the clamp at any one point upon the hose or other article to which it is applied, the band 15 has secured thereto, at a point substantially half way around the band from the support 17, a drawing strap 23, which lies against the periphery of the band 15 for a short distance and terminates at its free end in a traveler 24 which, as will hereinafter appear, serves as a nut. The length of the drawing strap 23 from the point where it is secured to the band 15 to the traveler 24 is such as to permit movement of the traveler along the screw 19 to completely contract the band and bring the traveler 24 and support 17 together. By this construction, it will be observed that as the traveler is moved toward the support, the band 15 will be drawn longitudinally in a circular path so that an even contraction of the band is insured and no one point of the hose or other article with undue pressure. The drawing strap 23 may be secured to the band 15 in any desired manner, and is shown in Figs. 1, 2 and 3 as eyeleted to the band by providing the band with a perforation 25 at the point of attachment and stamping or otherwise suitably forming lugs 26 upon the inner face of the strap 23, which lugs are adapted to enter the aperture 25 and be turned over thereagainst as shown in Fig. 1 to bind the end of the strap 23 against the outer face of the band 15. The strap is made preferably of a relatively flexible or pliable material and is of slightly less width or thickness than that of the body of the clamp. Because the strap is pliable or flexible it readily conforms to the outer surface of the band, as the traveler is drawn toward the support, and thus prevents any undue pressure of the strap 23 against the underlying portion of the band.

Figure 4:
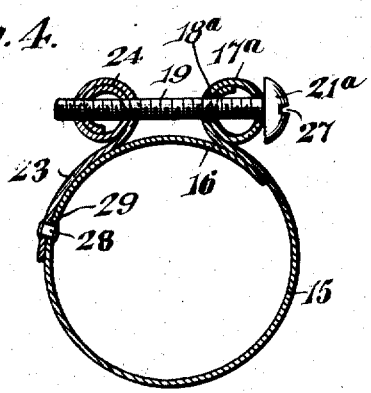
Fig. 4 is a transverse sectional view through a slightly modified form of the clamp.
Figure 5:
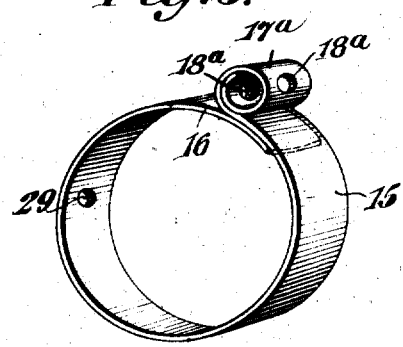
Fig. 5 is a detail perspective view of the body portion or band of the clamp of Fig. 4.

In Figs. 4 and 5 a slightly modified form of the invention is shown wherein the band 15, instead of being bent outwardly from the body of the clamp as above described, is rolled or turned over upon itself to provide a cylindrically coiled support 17ª which by reason of its coiled form presents a plurality of bracing walls providing a substantial and rigid support for the clamping screw. The walls of the turns of the support 17ª are suitably perforated as at 18ª to admit of the free passage of the shank of the clamping screw 19 therethrough. The head 21ª of the clamping screw 19 of Fig. 4, is provided with a kerf 27 for the reception of a screw driver or other suitable operating tool. In Fig. 4, the drawing strap 23 is secured to the band 15 by a rivet 28 passed through the end of the strap 23 and through an aperture 29 formed at the desired point in the band 15. The structure of the clamp shown in Figs. 4 and 5 is particularly adapted for large and heavy work, and for this purpose is provided with both the rolled over or coiled support 17ª, and the rolled over or coiled traveler 24.

Figure 6:
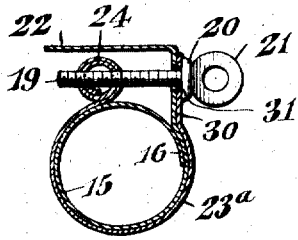
Fig. 6 is a transverse section through the clamp of Fig. 1, showing a modified form of the drawing strap.
Figure 7:
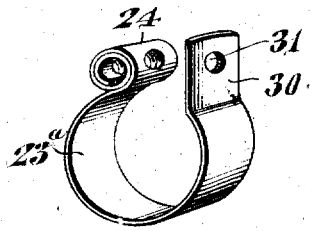
Fig. 7 is a detail perspective view of the modified form of drawing strap.

The structure of clamp shown in Figs. 6 and 7 is substantially the same as shown in Fig. 1, with the exception that a modified form of drawing strap 23ª is employed. In this form, the drawing strap 23ª passes entirely around the band 15 and has its inner end turned outwardly as at 30 and provided with an aperture 31 for the reception of the shank of the clamping screw 19, which latter passes through the support 17 and also through the traveler 24 carried on the free end of the strap. In this construction, the eyelet, the rivet and other like fastening devices are done away with, as the clamping screw is utilized in holding the inner end of the strap against the band.

Figure 8:
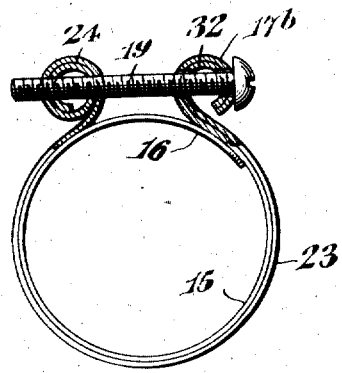
Fig. 8 is an end view of the clamp shown partly in section and disclosing another modified form of the drawing strap.

The band 15 may be provided with a drawing strap 23 surrounding the band as shown in Fig. 8, and in lieu of an outturned end 30 it has a coiled or turned over portion provided with a head 32 to fit into the coiled or rolled over support 17ᵇ of the band 15. The support 17ᵇ is not entirely closed, but is left slightly open adjacent to the band 15 to facilitate the lateral insertion of the head 32 in assembling the parts of the clamp. In the structure of Fig. 8 both the head 23 and the socket 17ᵇ have transverse registering openings therethrough freely receiving the shank of the clamping screw 19. The advantage of this structure is that the support for the clamping screw is reinforced and forms a substantial structure, while the drawing strap 23 is held in place, may be readily detached and performs the same function of drawing the band 17 longitudinally as is accomplished in the above described forms of the invention.

Figure 9:
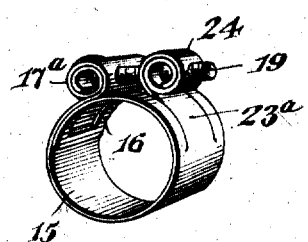
Fig. 9 is a detail perspective view of a modified form of the clamp wherein the drawing strap is integral with the body of the clamp.

In Fig. 9 of the drawing, there is disclosed a form of clamp wherein the band as well as the drawing strap are made in one piece. The band 15 is provided at one end with a tongue 16 which is lapped underneath the other end of the band. From the tongue 16 and the adjacent portion of the band 15 the drawing strap 23ª is stamped, the latter being rolled upon itself and backwardly from the extremity of the tongue. This rolled or coiled portion of the strap is suitably apertured and threaded to produce a traveler 24, through which is threaded the corresponding end of the clamping screw 19. Instead of being separately formed the strap 23 merges into the band 15 so that the same circumferential drawing action results from the use of the strap 23ª as in the other forms.

Figure 10:
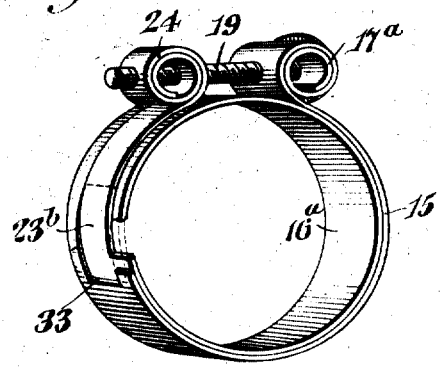
Fig. 10 is a detail perspective view of a further modified form of the clamp wherein the drawing strap is integral with the body of the clamp.

In Fig. 10 there is shown a further modified form of the invention, wherein the band 15 is provided with a relatively long tongue 16ª, which latter terminates in a drawing strap 23ᵇ of reduced width for passage through an elongated opening 33 formed in the body of the band 15 at a point substantially half way around the band from the support 17ª. The strap 23ᵇ projects through this opening 33 and lies flat against the outer face of the band 15 so as to permit the free and uninterrupted action of the strap 23ᵇ. The free end of the strap 23ᵇ is provided with a coiled traveler 24 through which is threaded the stem of the clamping screw 19.

Figure 11:
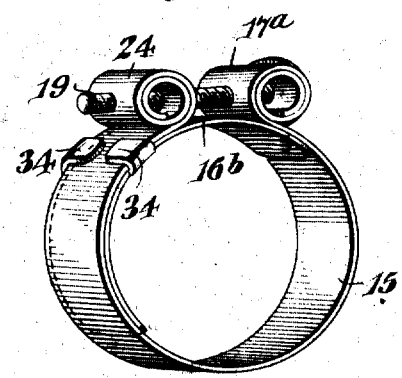
Fig. 11 is a similar view disclosing a still further modified form of the clamp wherein the tongue is independent of the body of the clamp.
Figure 12:
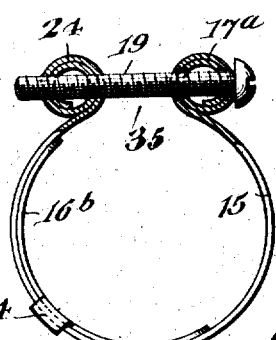

In Figs. 11 and 12 there is disclosed a form of this invention which admits of its ready application to a hose or pipe, when conditions are such that it is impossible to slip the clamp over the end of the hose or pipe, but wherein the band 15 must be sprung laterally over the hose or pipe. In this form of the invention, the band 15 is provided with the support 17ª at one end through which loosely passes the stem of the clamping screw 19, and upon its opposite end is provided with the traveler 24 which in this instance is formed by rolling over or coiling the extremity of the band 15. The tongue 16ᵇ of the clamp is substantially semi-circular in form and fits snugly against the inner face of the band 15. Extending laterally from the tongue 16ᵇ at a point intermediate the ends thereof is a pair of fingers 34 which are bent about the opposite edges of the band 15, to constitute guiding and retaining means for the tongue 16ᵇ which is adapted to slide longitudinally of the band 15 so as to close the throat 35 of the clamp after the latter has been positioned upon the hose or pipe as shown in Fig. 11, and to allow for the withdrawal of the tongue 16ᵇ from the throat to provide for a free passage between the support 17ª and the traveler 24 to admit a hose or pipe therethrough, as shown in Fig. 12. It will be noted that in all of the various forms of this invention herein disclosed, the traveler is of cylindrically coiled form to provide for a substantial structure integral with or secured to the body of the clamp, so that the separate nuts or other like devices are done away with and a more substantial and compact structure is produced. Furthermore, in each of the forms the traveler is connected to a strap which extends for a considerable distance about the band 15, and which is pliable or flexible to lie flat against the periphery of the band and to thus convert rectilinear movement of the traveler 24 into a circumferential stress upon the band 15.

The clamp of this invention is of such structure that pinching or drawing of the hose is eliminated, a maximum clamping effect is had with a minimum expenditure of work upon the clamping screw, and all of the features of operation and structure are combined in a clamp of relatively few parts easily made and assembled and which are light, strong and durable, and as a whole the device presents a clamp of attractive appearance occupying but relatively small space and which may be handled in confined places.

The features of the invention may be embodied in forms of clamps other than those hereinbefore described and shown in the drawings, for it is evident that the invention is capable of many modifications.

The rolling over or coiling of the metal strip produces a traveler made of a single strip of metal, such as sheet metal, but by including a plurality of closely associated walls each having a screw threaded aperture therethrough to receive the clamping screw, the traveler or nut is made particularly resistant to the stripping of the screw threads of the nut. Normally the apertures in the walls register, so that the clamp screw freely enters the nut which may, therefore, be considered as a multi-walled nut in which the walls are capable of moving one relative to the other under the tension put thereon by the clamp screw. Therefore, not only is the necessity of a separate nut eliminated, but the clamping screw is automatically locked or held from accidental turning movement when the screw is tightened.

What is claimed is:—

1. A band-like hose clamp of sheet metal having opposed ends, one provided with a passage arranged to be freely traversed by a clamp screw, and the other rolled or coiled spirally upon itself to form a multi-walled nut with the walls having normally alined screw-threaded passages for the clamp screw.

2. A sheet metal hose clamp of band form having opposed ends, one apertured for the free passage of a clamp screw, and the other rolled or coiled upon itself to constitute a multi-walled and substantially cylindrical nut with alined screw-threaded apertures traversing the turns of the coil in a direction substantially diametric thereof.

3. A sheet metal hose clamp of band form having opposed terminal portions for the passage of a clamp screw, one of said terminal portions being spirally rolled or coiled upon itself into substantially cylindrical form with the turns relatively movable with respect one to the other and provided with a screw-threaded passage for a clamp screw traversing the turns, whereby upon being put under clamping strain by the screw the walls tend to move one relatively to the other and bind upon the screw.

4. A hose clamp having at one end a nut constituting a part of the clamp, and comprising a coil of substantially cylindrical form with alined screw-threaded apertures through the walls of the coils and the turns of the coil being relatively movable with respect one to the other under the strain of a clamping screw traversing them.

5. In a clamp, a band, a support at one end of the band, a clamp screw mounted to turn freely on the support, a strap secured to and extending longitudinally of the band and lying against the outer face thereof, and a nut or traveler on the free end of the strap and comprising a spirally rolled up or coiled end of the strap in substantially cylindrical form and provided with a transverse opening therethrough threaded to receive the threaded shank of the clamp screw.

6. In a clamp, a band, a clamp screw carried on one end of the band, a traveler on the screw, and a strap secured to and extending longitudinally of the band against the outer face thereof and secured at its opposite end to the traveler.

7. In a clamp, a one-piece metal strap in the form of a band, and having at one end an outturned portion constituting a support and a laterally turned-over extremity to provide a guard, said outturned portion being provided with an aperture, a clamping screw extending through the aperture and adapted to abut at its head end against the support, a strap secured at one end to the outer face of the band and having its opposite end rolled or coiled upon itself to provide a cylindrical traveler, and the latter having a transverse threaded aperture therethrough for the reception of the threaded end of the clamp screw, and a tongue comprising an extremity of the strap extending between the traveler and the support and lapping beneath the latter.

8. A hose clamp of sheet metal formed into a clamping band with opposed terminal portions, one having an opening therethrough for the passage of a clamping screw and in which the clamping screw is free to turn, and the other terminal portion being formed into a multi-walled nut for the screw, the first-named terminal portion of the clamp having an extension of a length overlapping the nut to constitute a guard.

9. A hose clamp of sheet metal formed into a clamping band with opposed terminal portions, one having an opening therethrough for the passage of a clamping screw and in which the clamping screw is free to turn, and the other terminal portion being formed into a multi-walled nut for the screw, the first-named terminal portion of the clamp having an extension of a length overlapping the nut to constitute a guard, and the band portion of the clamp also having an extension constituting a tongue bridging the space between the two terminal portions to prevent pinching of the hose when the terminal portions are drawn one toward the other.

10. A hose clamp of sheet metal of band form comprising two members, one having an aperture for the passage of a clamp screw and in which aperture the screw is free to turn with an extension on one side of the aperture constituting a guard and on the other side thereof constituting a tongue, and the other member terminating in a rolled over or coiled part with alined screw-threaded passages through the turns of the coil to constitute a multi-walled nut, the extension overlapping the nut and the tongue bridging the space between the nut and the terminal portion of the first-named part of the band traversed by the screw.

In testimony, that we claim the foregoing as our own, we have hereto affixed our signatures in the presence of two witnesses.

JAMES J. COOK.
CHARLES H. COOK.

Witnesses:
CHAS. C. HARMAN,
EDWIN F. AYMAR.